(12) United States Patent
Freeman et al.

(10) Patent No.: US 10,861,160 B2
(45) Date of Patent: Dec. 8, 2020

(54) DEVICE AND A METHOD FOR ASSIGNING LABELS OF A PLURALITY OF PREDETERMINED CLASSES TO PIXELS OF AN IMAGE

(71) Applicant: Aptiv Technologies Limited, St. Michael (BB)

(72) Inventors: Ido Freeman, Düsseldorf (DE); Jan Siegemund, Cologne (DE)

(73) Assignee: Aptiv Technologies Limited, St. Michael (BB)

( * ) Notice: Subject to any disclaimer, the term of this patent is extended or adjusted under 35 U.S.C. 154(b) by 97 days.

(21) Appl. No.: 16/143,741

(22) Filed: Sep. 27, 2018

(65) Prior Publication Data

US 2019/0114779 A1 Apr. 18, 2019

(30) Foreign Application Priority Data

Oct. 18, 2017 (EP) .................................... 17196983

(51) Int. Cl.
*G06T 7/00* (2017.01)
*G06T 7/13* (2017.01)
*G06N 7/00* (2006.01)
*G06K 9/46* (2006.01)

(52) U.S. Cl.
CPC .............. *G06T 7/13* (2017.01); *G06K 9/4628* (2013.01); *G06N 7/005* (2013.01); *G06T 2207/30256* (2013.01); *G06T 2207/30261* (2013.01)

(58) Field of Classification Search
CPC ............. G06T 7/13; G06T 2207/30256; G06T 2207/30261; G06K 9/4628; G06N 7/005
See application file for complete search history.

(56) References Cited

U.S. PATENT DOCUMENTS

| 2015/0206319 | A1* | 7/2015 | Dollar | G06T 7/13 |
| | | | | 382/159 |
| 2016/0217335 | A1 | 7/2016 | Levi et al. | |
| 2017/0169313 | A1* | 6/2017 | Choi | G06K 9/6267 |

OTHER PUBLICATIONS

Song Yuheng, et al: "Image Segmentation Algorithms Overview", Jul. 7, 2017, pp. 1-6 (Year: 2017).*
Liang-Chieh Chen, et al: "DeepLab: Semantic Image Segmentation with Deep Convolutional Nets, Atrous Convolution, and Fully Connected CFRs", Jun. 2, 2016, pp. 1-14.

(Continued)

*Primary Examiner* — Ping Y Hsieh
(74) *Attorney, Agent, or Firm* — Colby Nipper PLLC

(57) ABSTRACT

A device for assigning one of a plurality of predetermined classes to each pixel of an image, the device is configured to receive an image captured by a camera, the image comprising a plurality of pixels; use an encoder convolutional neural network to generate probability values for each pixel, each probability value indicating the probability that the respective pixel is associated with one of the plurality of predetermined classes; generate for each pixel a class prediction value from the probability values, the class prediction value predicting the class of the plurality of predetermined classes the respective pixel is associated with; use an edge detection algorithm to predict boundaries between objects shown in the image, the class prediction values of the pixels being used as input values of the edge detection algorithm; and assign a label of one of the plurality of predetermined classes to each pixel of the image.

15 Claims, 3 Drawing Sheets

(56) References Cited

OTHER PUBLICATIONS

Song Yuheng, et al: "Image Segmentation Algorithms Overview", Jul. 7, 2017, pp. 1-6.
Alberto Garcia-Garcia, et al: "A Review on Deep Learning Techniques Applied to Semantic Segmentation", Apr. 23, 2017, pp. 1-24.
Freeman, "Using Continuous Graphical Models to Structure and Improve Disparity Estimations", Sep. 10, 2016, 35 pages.

* cited by examiner

DEVICE AND A METHOD FOR ASSIGNING LABELS OF A PLURALITY OF PREDETERMINED CLASSES TO PIXELS OF AN IMAGE

TECHNICAL FIELD OF INVENTION

This disclosure generally relates to a device and a method for assigning labels of a plurality of predetermined classes to pixels of an image.

BACKGROUND OF INVENTION

The goal of semantic segmentation is to label every pixel in a given input image with one of several predetermined classes, e.g. a car, pedestrian, road, buildings, etc. Having such reliable pixel-wise labels would allow for more efficient and accurate vision algorithms. For example, lane detection could be executed much faster, knowing where the road is. The detection errors, i.e., false positives, of head and taillights could be drastically reduced if these are only searched within vehicles.

As modern images contain several million pixels, the task quickly becomes extremely computationally demanding, even for the most efficient algorithms which scale linearly with the number of pixels. The applicability of such algorithms to embedded systems in interactive runtimes would require high-end systems which, in turn, would result in significantly higher product costs and reduced competitiveness. Current state of the art algorithms often report execution cycles of 2-4 frames per second (FPS) on high voltage expensive hardware such as graphical processing units (GPUs).

The most accurate algorithms to date use convolutional neural networks (CNNs). CNNs are a sort of artificial neural networks designed to mimic the human visual processing system from the eye to the visual cortex. They are made of an arbitrary number of consecutive layers which are trained together to fulfil a given visual task, e.g., object classification. Each layer learns to recognize features which are relevant to the specific task in an increasing complexity. For example, for the task of separating humans from cats in images, the first layer commonly learns to look for edges and color gradients, e.g., skin color. The second layer then learns to combine these edges and colors to simple shapes like fingers versus paws/claws, pointy ears, etc. The last layer then looks for high-level features like four legs.

CNNs for sematic segmentation commonly present an encoder-decoder structure which allows for dense predictions. The encoder model is trained to 'see' and 'understand' the input image while creating a compact, high-dimensional mathematical representation of the input. Then, the decoder takes the output of the encoder and gradually interpolates it back to the original scale while producing the correct labels, see Jonathan Long, Evan Shelhamer and Trevor Darrell: "Fully Convolutional Networks for Semantic Segmentation", Proceedings of the IEEE Conference on Computer Vision and Pattern Recognition, 2015; and Vijay Badrinarayanan, Alex Kendall and Roberto Cipolla: "SegNet: A Deep Convolutional Encoder-Decoder Architecture for Image Segmentation", arXiv preprint arXiv:1511.00561, 2015. This technique has proven accurate yet computationally demanding. The amount of computations (FLOPS) done by the decoder is commonly roughly twice the FLOPS of the encoder and at the very least 1.33 times this amount.

One of the methods to avoid an expensive decoder module while still predicting full scale labels was presented by Koltun et al., see Philipp Krähenbühl and Vladlen Koltun: "Efficient Inference in Fully Connected CRFs with Gaussian Edge Potentials", Adv. Neural Inf. Process. Syst. 2.3, 2011. In their paper, Koltun et al. discuss the usage of a fully connected conditional random field (CRF) to redraw the connection between the unary, conditionally independent predictions from the encoder and the desired full-scale output. CRFs allow the pixels in the image to 'communicate' based on properties as proximity and intensity. By doing so, neighboring pixels with similar color intensities 'agree' on the most probable label for them to assume. The algorithm is more efficient since it only uses a single layer which scales linearly with the number of pixels instead of the multiple layers in the decoder module. Furthermore, it has no more than ten trainable parameters, comparing to millions in the decoder, wherein exact numbers vary with the implementation and design decisions.

Chen et al. used a CNN as a unary classifier from which the outputs were given to the CRF as the inputs, see Liang-Chieh Chen and George Papandreou: "DeepLab: Semantic Image Segmentation with Deep Convolutional Nets, Atrous Convolution, and Fully Connected CRFs", arXiv preprint arXiv:1606.00915, 2016. Zheng et al. have further improved the model by integrating the CRF into the encoder, resulting in an end-to-end trainable system, see Shuai Zheng, Sadeep Jayasumana, Bernardino Romera-Paredes, Vibhav Vineet, Zhizhong Su, Dalong Du, Chang Huang and Philip H. S. Torr: "Conditional Random Fields as Recurrent Neural Networks", Proceedings of the IEEE International Conference on Computer Vision, 2015.

SUMMARY OF THE INVENTION

Described herein is a device for assigning a label of one of a plurality of predetermined classes to each pixel of an image, wherein the device generates results with a high accuracy faster than conventional devices. It is further an object of the invention to provide a system that comprises the device and a method for assigning a label of one of a plurality of predetermined classes to each pixel of an image.

The object underlying the invention is satisfied by the features of the independent claims. Advantageous further developments and aspects of the invention are set forth in the dependent claims.

In a first aspect of the invention a device for assigning a label of one of a plurality of predetermined classes to each pixel of an image is provided.

The device is configured to receive an image captured by a camera, wherein the image comprises a plurality of pixels. The device uses an encoder convolutional neural network to generate probability values for each pixel. Each probability value indicates the probability that the respective pixel is associated with one of the plurality of predetermined classes. Further, the device generates for each pixel a class prediction value from the probability values. Each class prediction value predicts the class of the plurality of predetermined classes the respective pixel is associated with. The device also uses an edge detection algorithm to predict boundaries between objects shown in the image, wherein the class prediction values of the pixels are used as input values for the edge detection algorithm. Further, the device assigns a label of one of the plurality of predetermined classes to each pixel of the image by using the predicted boundaries.

According to the first aspect of the invention, the problem of low FPS rates is solved by leveraging on the nature of the very task. When looking at an image on the labels level, it is easy to see that it is extremely sparse. Most objects in the real-world are continuous blobs with clearly defined edges on their boundaries. If, for example, a given pixel belongs to a road, its neighbor pixel is also very likely to belong to the same road, especially when having a very similar color intensity. The uncertainty mostly rises along the boundaries of the objects.

We leverage on this property of natural images to significantly reduce the execution time of the CRF to the sub-linear domain. Using the low-resolution predictions from the encoder convolutional neural network, the edge detection algorithm is first applied to get the prediction boundaries. To simplify the work of the edge detection algorithm, the actual class prediction values are used instead of the probability values. The benefit here is a two-fold. First, using the class prediction values the algorithm can be applied to an arbitrary number of labels, whereas using the class probability values would only be applicable to binary classification tasks. Second, unlike the probability intensities, the edges here become clearer and crispier meaning extremely simple edge detectors can be used while still getting state-of-the-art results.

In addition, the device according to the first aspect of the invention eliminates the need of a decoder as used in conventional encoder-decoder convolutional neural networks. Thus, the device does not comprise a decoder convolutional neural network.

In one embodiment, the device is further configured to create a mask, in particular a binary mask, which covers (or selects) the pixels of the predicted boundaries. Further, the device filters the pixels covered by the mask and, in particular, the class prediction values of these pixels. All other pixels and their class prediction values may not be filtered. The mask is used to adaptively skip persistent predictions in the CRF computation.

The device may also be configured to add pixels in the local neighborhood of the predicted boundaries to the mask. The pixels added to the mask and, in particular, the class prediction values are also filtered. By adding these pixels to the mask the accuracy of the detection is increased.

In a further embodiment, an arg max (arguments of the maxima) operator is used for generating the class prediction values from the probability values. The arg max operator generates for each pixel the class predicting value by selecting the class associated with the probability value having the highest probability value for the respective pixel.

The camera may be mounted on a vehicle. The camera may be directed to an area in front or in the rear or at a side of the vehicle. Images may be captured by the camera when the vehicle is moving.

The edge detection algorithm may be a Sobel edge detection algorithm. The Sobel edge detection algorithm performs only two convolutions with small kernels thereby accelerating the detection.

In order to reduce computations further, the kernels of the edge detection algorithm may be applied in strides to the pixels of the image. For example, for a stride of two, computations are reduced by a factor of four.

According to a second aspect of the invention, a system for assigning a label of one of a plurality of predetermined classes to each pixel of an image comprises a camera capturing the image and a device as described above.

According to a third aspect of the invention, a method for assigning a label of one of a plurality of predetermined classes to each pixel of an image comprises the following steps: receiving an image captured by a camera, the image comprising a plurality of pixels; using an encoder convolutional neural network to generate probability values for each pixel, each probability value indicating the probability that the respective pixel is associated with one of the plurality of predetermined classes; generating for each pixel a class prediction value from the probability values, the class prediction value predicting the class of the plurality of predetermined classes the respective pixel is associated with; using an edge detection algorithm to predict boundaries between objects shown in the image, the class prediction values of the pixels being used as input values of the edge detection algorithm; and assigning a label of one of the plurality of predetermined classes to each pixel of the image.

The method may comprise the embodiments disclosed above in connection with the device according to the first aspect of the invention.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will be described in more detail in the following in an exemplary manner with reference to an embodiment and to the drawings. There are shown in these.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
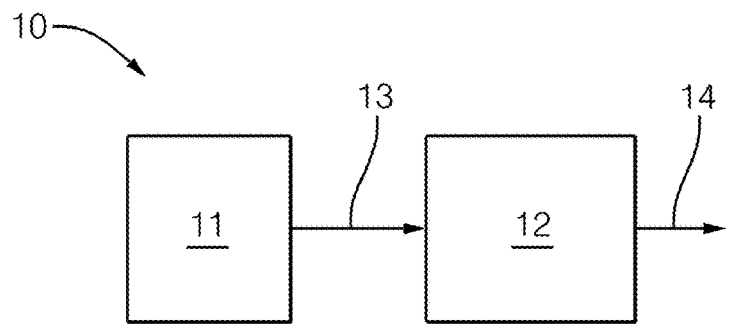
FIG. 1 is a schematic representation of an exemplary embodiment of a system for assigning a label of one of a plurality of predetermined classes to each pixel of an image.

FIG. 1 schematically illustrates a system 10 that allows assigning labels of a plurality of predetermined classes to pixels of an image. The system 10 includes a camera 11 and a device 12.

The camera 11 is mounted on a vehicle and captures images 13 of the area in front of the vehicle. Alternatively, the camera 11 may be directed to an area in the rear and/or at a side of the vehicle.

The images 13 captures by the camera 11 are fed to the device 12. The device 12 generates an output image 14 where each pixel of the image 13 is labelled with one of a plurality of predetermined classes.

Figure 2:
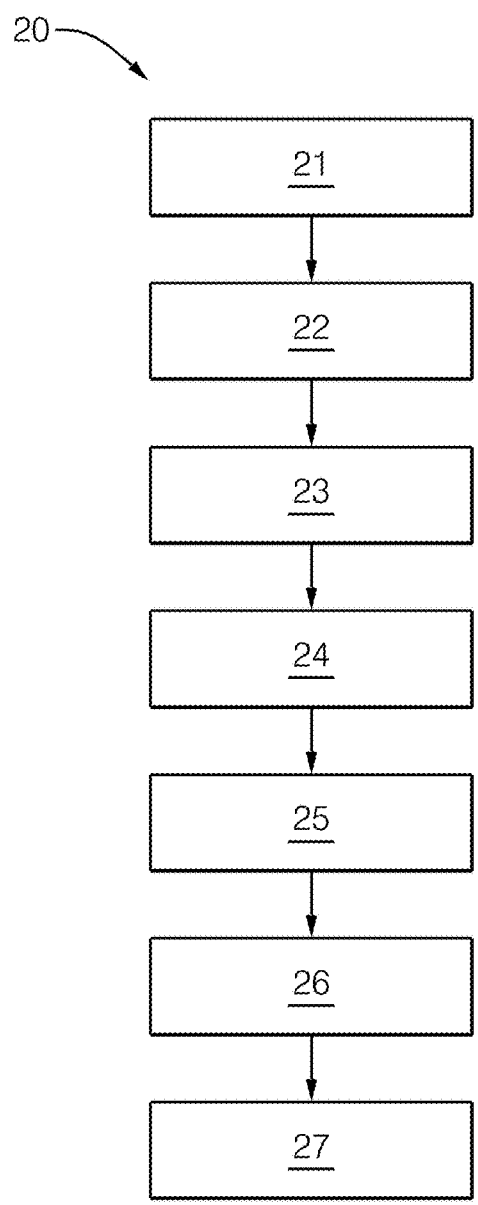
FIG. 2 is a schematic representation of an exemplary embodiment of a method for assigning a label of one of a plurality of predetermined classes to each pixel of an image.

The device 12 performs a method 20 for assigning a label of one of a plurality of predetermined classes to each pixel of an image as schematically illustrated in FIG. 2.

The device 11, the system 10 and the method 20 are exemplary embodiments according to the first, second and third aspect of the invention, respectively.

In step 21 of the method 20 illustrated in FIG. 2, the device 12 receives an image 13 captured by the camera 11 at its input. The image 13 includes a plurality of pixels arranged in an array. The image 13 may, for example, be an RGB image with channels for red, green and blue, a greyscale image, a grey and red image or any other suitable image.

In step 22, the image 13 is input in an encoder convolutional neural network that consists of several convolutional layers and performs multiple convolution and pooling operations. The different convolutional layers are trained to detect different patterns in the image 13. The final layer of the encoder convolutional neural network outputs an array of pixels where an individual probability value is assigned to each pixel. Each probability value indicates the probability that the respective pixel is associated with one of a plurality of predetermined classes (or object categories). The classes divide the objects shown in the images 13 in different categories that can be typically found in road scenes. For example, there can be a class for vehicles, another class for pedestrians, another class for roads, another class for buildings etc. The probability value of a given pixel for one of the classes then indicates the probability that the respective pixel is associated with this particular class.

In one example, there are the following classes: vehicle, pedestrian, road and building. The probability values output by the final layer of the encoder convolutional neural network for one of the pixels are, for example, 0.1, 0.1, 0.6 and 0.2 indicating the probability that this particular pixel belongs to a vehicle, a pedestrian, a road and a building, respectively.

In step 23, a class prediction value is generated for each pixel from the probability values. The class prediction value for a given pixel predicts the class the respective pixel belongs to. This step can be performed by an arg max operator. The arg max operator searches for the highest probability value of a particular pixel and selects the class associated with the highest probability value. In the example given above, the class 'road' is selected as this class has the highest probability value among all probability values of the particular pixel. The class prediction value of this pixel thus predicts that the pixel is associated with a road in the image 13.

In step 24, the class prediction values of the pixels are input in an edge detection algorithm. The edge detection algorithm predicts the boundaries between objects shown in the image 13.

The edge detection algorithm can be a Sobel edge detection algorithm. Further, the edge detection algorithm is applied in strides to the pixels of the image, for example, in strides of 2. In this case, the step size of the edge detection algorithm is two pixels.

In step 25, a binary mask is created from the predicted boundaries. The mask covers the pixels of the predicted boundaries. In addition, the boundaries can be padded such that a small local neighborhood is included in the binary mask.

Figure 3A:
FIG. 3A is an illustration of the binary class distribution for 'not a road' from the encoder convolutional neural network.
Figure 3B:
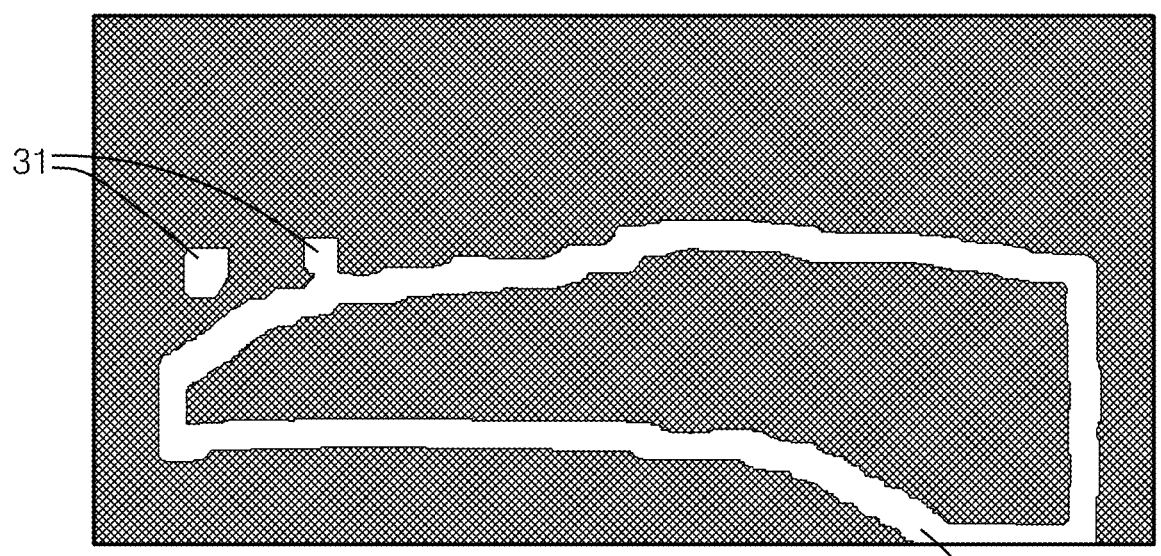
FIG. 3B is a binary mask created for the illustration shown in FIG. 3A.

An example of a binary mask is shown in FIG. 3B and denoted by reference sign 30. The binary mask 30 was created for the image of FIG. 3A which illustrates the binary class distribution for 'not a road' from the encoder convolutional neural network. The black pixels in FIG. 3A are more likely to be a road than white pixels. In the lower central region of the illustration of FIG. 3A a road is located. In the representation shown in FIG. 3B the binary mask 30 indicates the edges of the road shown in the illustration of FIG. 3A. In addition, pixels in the local neighborhood of the predicted boundaries have been added to the mask 30.

In step 26, the class prediction values of the pixels covered by the mask 30 are filtered. All other pixels are not filtered. As a result of the filtering detection errors, i.e., false boundaries, which are denoted by 31 in FIG. 3B, are eliminated.

Finally, in step 27, a label of one of the plurality of predetermined classes is assigned to each pixel of the image. For the inner pixels of an object, the class prediction values generated in step 23 are used for labeling the respective pixels. The boundaries of the objects are labelled with the class prediction values generated by the filtering in step 26.

In the output image 14, each pixel of the image 13 is labelled with one of the plurality of predetermined classes.

As natural scenes present significantly less edges than objects, the invention considerably reduces the computational cost of the algorithm. On the task of road detection, a runtime of just 10-30% of the original CRF computation time can be achieved. Since a binary mask is used, the access time to the mask's elements as well as the additional memory requirements are kept to a minimum and introduce a neglectable overhead. Furthermore, it is not necessary to add a further worst-case complexity to algorithm. In the worst possible case, where each pixel is assigned a different label, we simply get the original CRF algorithm.

Figure 4A:
FIG. 4A is a segmentation of the illustration shown in FIG. 3A produced by a conventional algorithm.
Figure 4B:
FIG. 4B is a segmentation of the illustration shown in FIG. 3A produced by the method shown in FIG. 2.
Figure 4C:
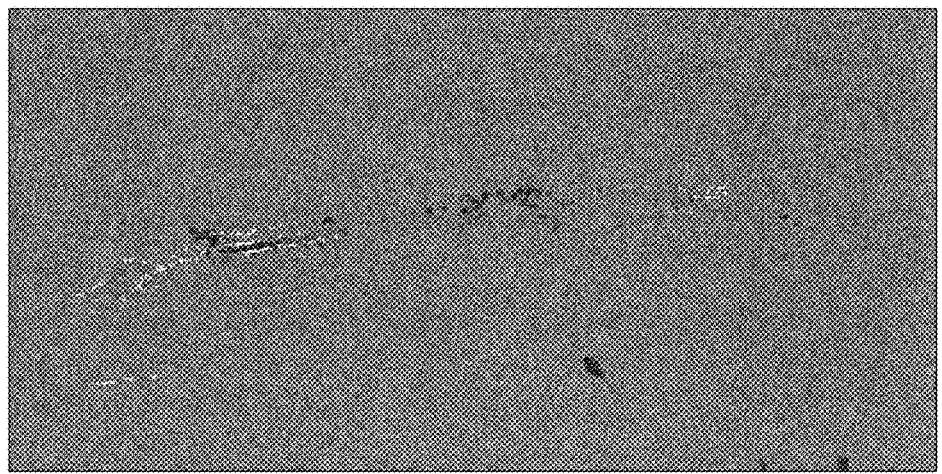
FIG. 4C is a representation of the differences between the segmentations shown in FIGS. 4A and 4B.

FIGS. 4A-4C show a comparison between results generated by a conventional algorithm and the invention. In FIG. 4A the segmentation of an image produced by a conventional algorithm is illustrated, whereas FIG. 4B shows the segmentation generated by the algorithm according to the invention. The segmentation shown in FIG. 4B only requires a runtime of 11% of the conventional algorithm.

FIG. 4C illustrates the differences between the segmentations shown in FIGS. 4A and 4B. Grey indicates identical results, white in FIG. 4C is white in the image of FIG. 4A while black in image of FIG. 4B, and black in FIG. 4C is black in the image of FIG. 4A while white in image of FIG. 4B. The agreement rate of both algorithms is 99.4%. Meaning only 0.6% of the results is affected by the fast approximation according to the invention.

The novel contribution in the shape of the adaptive filtering mask 30 places the algorithm on an entirely new level on the runtime versus accuracy scales. While other conventional algorithms are either drastically slower or not as accurate, the method according to the invention manages to achieve a competitive result on both axes.

In terms of pure runtime, the following table demonstrates the improvement in the different components on a single, random example for the filtering part of the pipeline.

| Component | Conventional algorithm: time in ms | Invention: time in ms |
| --- | --- | --- |
| Variables initialization | 16 | 1 |
| Lattice computation | 171 | 17 |
| Neighbors computation | 29 | 5 |
| Normalization | 1 | 0 |
| Splatting | 13 | 1 |
| Blurring | 2 | 1 |
| Slicing | 22 | 3 |
| Normalization | 3 | 1 |

While the improvement in runtime comes with a toll to the accuracy, the latter is practically neglectable with a label agreement rate of 99.4% between the conventional algorithm and the novel algorithm.

We claim:

1. A device (12) for assigning a label of one of a plurality of predetermined classes to each pixel of an image (13), the device (12) is configured to
   receive an image (13) captured by a camera (11), the image (13) comprising a plurality of pixels;
   use an encoder convolutional neural network to generate probability values for each pixel, each probability value indicating the probability that the respective pixel is associated with one of the plurality of predetermined classes;
   generate for each pixel a class prediction value from the probability values, the class prediction value predicting the class of the plurality of predetermined classes the respective pixel is associated with;
   use an edge detection algorithm to predict boundaries between objects shown in the image (13), the class prediction values of the pixels being used as input values of the edge detection algorithm; and
   assign a label of one of the plurality of predetermined classes to each pixel of the image (13) based on the predicted boundaries.

2. The device (12) as claimed in claim 1, wherein the device (12) is further configured to:
   create a mask (30) that covers pixels of the predicted boundaries; and
   filter the pixels of the predicted boundaries covered by the mask (30).

3. The device (12) as claimed in claim 2, wherein the device (12) is further configured to add pixels in local neighborhoods of the predicted boundaries to the mask (30).

4. The device (12) as claimed in claim 1, wherein the device (12) is further configured to generate for each pixel the class predicting value by selecting the class associated with the probability value having a highest probability value for the respective pixel.

5. The device (12) as claimed in claim 1, wherein the camera (11) is mounted on a vehicle.

6. The device (12) as claimed in claim 1, wherein the edge detection algorithm is a Sobel edge detection algorithm.

7. The device (12) as claimed in claim 1, wherein kernels of the edge detection algorithm are applied in strides to the pixels of the image (13).

8. A system (10) for assigning a label of one of a plurality of predetermined classes to each pixel of an image (13), the system (10) comprising:
   a camera (11) capturing the image (13) and
   a device (12) configured to:
      receive the image (13) captured by the camera (11), the image (13) comprising a plurality of pixels;
      use an encoder convolutional neural network to generate probability values for each pixel, each probability value indicating the probability that the respective pixel is associated with one of the plurality of predetermined classes;
      generate for each pixel a class prediction value from the probability values, the class prediction value predicting the class of the plurality of predetermined classes the respective pixel is associated with;
      use an edge detection algorithm to predict boundaries between objects shown in the image (13), the class prediction values of the pixels being used as input values of the edge detection algorithm; and
      assign a label of one of the plurality of predetermined classes to each pixel of the image (13) based on the predicted boundaries.

9. A method (20) for assigning a label of one of a plurality of predetermined classes to each pixel of an image, the method comprising:
   receiving an image (13) captured by a camera (11), the image (13) comprising a plurality of pixels;
   using an encoder convolutional neural network to generate probability values for each pixel, each probability value indicating the probability that the respective pixel is associated with one of the plurality of predetermined classes;
   generating for each pixel a class prediction value from the probability values, the class prediction value predicting the class of the plurality of predetermined classes the respective pixel is associated with;
   using an edge detection algorithm to predict boundaries between objects shown in the image, the class prediction values of the pixels being used as input values of the edge detection algorithm; and assigning a label of one of the plurality of predetermined classes to each pixel of the image (13) based on the predicted boundaries.

10. The method (20) as claimed in claim 9, further comprising:
creating a mask (30) that covers pixels of the predicted boundaries; and
filtering the pixels of the predicted boundaries covered by the mask (30).

11. The method (20) as claimed in claim 10, further comprising adding pixels in local neighborhoods of the predicted boundaries to the mask (30).

12. The method (20) as claimed in claim 9, wherein for each pixel the class predicting value is generated by selecting the class associated with the probability value having a highest probability value for the respective pixel.

13. The method (20) as claimed in claim 9, wherein the camera (11) is mounted on a vehicle.

14. The method (20) as claimed in claim 9, wherein the edge detection algorithm is a Sobel edge detection algorithm.

15. The method (20) as claimed in claim 9, wherein kernels of the edge detection algorithm are applied in strides to the pixels of the image (13).

* * * * *